(12) United States Patent
Xu et al.

(10) Patent No.: US 9,850,396 B2
(45) Date of Patent: Dec. 26, 2017

(54) AQUEOUS COATING COMPOSITION

(71) Applicants: Dow Global Technologies LLC, Midland, MI (US); Rohm and Haas Company, Philadelphia, PA (US)

(72) Inventors: Yawei Xu, Shanghai (CN); Fu Zhan, Shanghai (CN); Xiaohong Yang, Shanghai (CN); Baoqing Zheng, Shanghai (CN); Biao Shen, Shanghai (CN); Yurun Yang, Shanghai (CN)

(73) Assignees: Dow Global Technologies LLC, Midland, MI (US); Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 14/896,191

(22) PCT Filed: Jun. 21, 2013

(86) PCT No.: PCT/CN2013/077616
§ 371 (c)(1),
(2) Date: Dec. 4, 2015

(87) PCT Pub. No.: WO2014/201674
PCT Pub. Date: Dec. 24, 2014

(65) Prior Publication Data
US 2016/0115341 A1  Apr. 28, 2016

(51) Int. Cl.
| | |
|---|---|
| *B60C 1/00* | (2006.01) |
| *C08K 3/34* | (2006.01) |
| *B05D 3/02* | (2006.01) |
| *C08G 18/08* | (2006.01) |
| *C08L 75/00* | (2006.01) |
| *C04B 14/04* | (2006.01) |
| *C09D 133/16* | (2006.01) |
| *C09D 133/08* | (2006.01) |
| *C09D 5/02* | (2006.01) |
| *C09D 7/12* | (2006.01) |
| *C08L 75/04* | (2006.01) |
| *C08K 3/36* | (2006.01) |

(52) U.S. Cl.
CPC ........... *C09D 133/16* (2013.01); *C09D 5/024* (2013.01); *C09D 7/1233* (2013.01); *C09D 133/08* (2013.01); *C08K 3/36* (2013.01); *C08L 75/04* (2013.01)

(58) Field of Classification Search
None
See application file for complete search history.

(56) References Cited

U.S. PATENT DOCUMENTS

| | | | |
|---|---|---|---|
| 5,188,867 A | 2/1993 | Chu et al. | |
| 5,609,965 A | 3/1997 | Esser | |
| 6,478,864 B1 | 11/2002 | Field | |
| 2003/0134978 A1 | 7/2003 | Tullos et al. | |
| 2003/0187134 A1 | 10/2003 | Probst et al. | |
| 2004/0062913 A1 | 4/2004 | Suto et al. | |
| 2005/0049330 A1* | 3/2005 | McFaddin | G03G 9/1355 523/223 |
| 2007/0021829 A1 | 1/2007 | Bolduc | |
| 2007/0218291 A1 | 9/2007 | Chiou et al. | |
| 2009/0318596 A1* | 12/2009 | Fu | C08G 18/0823 524/232 |
| 2010/0288963 A1* | 11/2010 | Mitina | B82Y 30/00 252/8.62 |
| 2011/0015943 A1 | 1/2011 | Keldie et al. | |

FOREIGN PATENT DOCUMENTS

| | | |
|---|---|---|
| CN | 102031048 A | 4/2011 |
| EP | 2557094 A1 | 2/2013 |

OTHER PUBLICATIONS

Keim Additec, The use of water based ULTRALUBE wax additives in different fields of application, technical information, 2011, p. 1-89.*

European Patent Office; extended European search report; Reference No. 72753-EP-EPT; Application No. Patent No. 13887507.5-1301/2986681 PCT/CN2013077616; 7 pages.

\* cited by examiner

*Primary Examiner* — Robert T Butcher
(74) *Attorney, Agent, or Firm* — Karl E. Stauss; Cantor Colburn LLP

(57) ABSTRACT

An aqueous coating composition capable of providing coating films with balanced properties of low gloss, high clarity, and good water resistance and alcohol resistance, and a process of making and using such aqueous coating composition.

15 Claims, No Drawings

AQUEOUS COATING COMPOSITION

FIELD OF THE INVENTION

The present invention relates to an aqueous coating composition and a process of making and using such aqueous coating composition.

INTRODUCTION

Waterborne matt coating compositions usually comprise inorganic or organic particles as matting agents to achieve the matt effect. Widely used matting agents in wood coatings include silica and polyurea matting agents. However, coating compositions comprising these conventional matting agents usually have unsatisfactory water resistance and alcohol resistance properties. Waterborne wood coatings in many applications such as in kitchens, bathrooms and dining tables are required to have sufficient water-resistance and 48% alcohol resistance to meet industry requirements, for example, the IKEA IOS-MAT-0066 R2 standard.

Compared to the above conventional matting agents, matting agents based on plastic beads such as polyethylene and polyacrylate beads may provide coating films with better water resistance and alcohol resistance. However, the gloss of such coating films is usually undesirably high. In wood coating industry, it is desirable that matt coating compositions provide a substrate with relatively low gloss finish with a gloss level of 20 or lower on a 60° Gardner Gloss scale. Simply increasing the dosage of matting agents can reduce the gloss level of the resultant coating films, but usually compromises one or more of the following properties: clarity, water-resistance and alcohol resistance of the coating films. For wood coatings, coating films desirably have clarity of 30% or higher.

Therefore, it is desirable to provide an aqueous coating composition that provides coating films with balanced properties of low gloss, high clarity, and good water resistance and alcohol resistance as described above.

SUMMARY OF THE INVENTION

We found that a novel combination of two different matting agents, an epoxy silane and a wax, provides coating films with balanced properties including a gloss level of 20 or lower on a 60° Gardner Gloss scale, a clarity value of 30% or higher, and a water-resistance level and a 48% alcohol-resistance level of 4 or higher according to the BS:EN12720: 2009 method. Such coating films meet the IKEA IOS-MAT-0066 R2 standard for water resistance and 48% alcohol resistance.

DETAILED DESCRIPTION OF THE INVENTION

The aqueous coating composition of the present invention comprises one or more polymer binders. The polymer binder may comprise one or more acrylic copolymers, polyurethane, vinyl acetate copolymers, polyurea, or mixtures thereof. "Acrylic" in the present invention includes (meth) acrylic acid, (meth)alkyl acrylate, (meth)acrylamide, (meth) acrylonitrile and their modified forms such as (meth)hydroxyalkyl acrylate.

The polymer binder useful in the present invention may comprise one or more copolymerized ethylenically unsaturated nonionic monomers. "Nonionic monomers" herein refer to copolymerized monomer residues that do not bear an ionic charge between pH=1-14. Examples of suitable ethylenically unsaturated nonionic monomers include (meth) acrylic ester monomers such as methyl acrylate, ethyl acrylate, butyl acrylate, 2-ethylhexyl acrylate, nonyl acrylate, decyl acrylate, lauryl acrylate, hydroxyethyl acrylate, hydroxypropyl acrylate, methyl methacrylate, ethyl methacrylate, butyl methacrylate, nonyl methacrylate, isodecyl methacrylate, lauryl methacrylate, hydroxyethyl methacrylate, and hydroxypropyl methacrylate; (meth)acrylonitrile; styrene and substituted styrene; butadiene; ethylene, propylene, 1-decene; vinyl acetate, vinyl butyrate, vinyl versatate and other vinyl esters; vinyl monomers such as vinyl chloride and vinylidene chloride; or mixtures thereof. The ethylenically unsaturated nonionic monomers preferably comprise (meth)acrylic ester monomers, or their combination with styrene.

The polymer binder useful in the present invention may further comprise one or more copolymerized ethylenically unsaturated monomers having one or more functional groups. The functional groups may be selected from carbonyl, acetoacetate, alkoxysilane, carboxyl, ureido, amide, imide, amino group, or mixtures thereof. Preferably, an ethylenically unsaturated monomer bearing a carbonyl group such as diacetone acrylamide is used. When present, the concentration of the functional-group-containing ethylenically unsaturated monomer may be, based on the weight of the polymer binder, 0.1 weight percent (wt %) or more, 0.5 wt % or more, or even 1 wt % or more, and at the same time, 20 wt % or less, 10 wt % or less, or even 5 wt % or less.

The polymer binder useful in the present invention may further comprise one or more copolymerized surfactants. The surfactant preferably bears an allyl group. Suitable commercially available surfactants include, for example, TREM™ LF-40 surfactant based on sodium alkyl allyl sulfosuccinate available from Cognis, ADEKA™ Resoap SR-10 reactive anionic emulsifier available from Adeka, DEXTROL™ OC-1525 surfactant based on ammonium phosphate ester nonyl phenol ethoxylate available from Dexter, LATEMUL™ PD-104 anionic polymerizable surfactant available from Kao Chemicals, HITENOL™ KH-10 anionic polymerizable surfactant available from Dai-ichi Kogyo Seiyaku Co. Ltd, or mixtures thereof. When present, the concentration of the surfactant may be, based on the weight of the polymer binder, 0.01 wt % or more, 0.3 wt % or more, or even 0.5 wt % or more, and at the same time, 10 wt % or less, 5 wt % or less, or even 2 wt % or less.

The polymer binder useful in the present invention may further comprise a chain transfer agent. Examples of suitable chain transfer agents include 3-mercaptopropionic acid, dodecyl mercaptan, methyl 3-mercaptopropionate, benzenethiol, azelaic alkyl mercaptan, or mixtures thereof. When present, the concentration of the chain transfer agent may be, based on the weight of the polymer binder, from 0.01 to 20 wt %, from 0.1 to 10 wt %, from 0.2 to 2 wt %, or from 0.3 to 1 wt %.

The polymer binder useful in the present invention may be in the form of a dispersion or an emulsion. The polymer binder emulsion may have solids from 30 to 70 wt %, from 35 to 60 wt %, or from 40 to 50 wt %, based on the total weight of the polymer binder emulsion.

The polymer binder useful in the present invention may comprise, based on the weight of the polymer binder, from 15 to 50 wt % of a first polymer having a glass transition temperature ($T_g$) of 30 to 90° C., and from 50 to 85 wt % of a second polymer having a $T_g$ of −30 to 30° C. formed by emulsion polymerization, in the presence of the first polymer. The value of $T_g$ herein is calculated according to the Fox Equation (T. G. Fox, Bull. Am. Phys. Soc. 1 (1956) 123). The $T_g$ difference of the first polymer and the second polymer may be more than 20° C., or even more than 40° C.

The polymer binder useful in the present invention may be prepared by emulsion polymerization known in the art. In some embodiments, the polymer binder comprises one or more acrylic copolymers. The acrylic copolymers may have a $T_g$ of −20° C. or more, 0° C. or more, or even 10° C. or more, and at the same time, 60° C. or less, 40° C. or less, or even 30° C. or less. Suitable commercially available acrylic copolymer emulsions include, for example, PRIMAL™ AC-261, ROSHIELD™ 3311, ROSHIELD EP-6060 and MAINCOTE™ 1100A acrylic emulsions all available from The Dow Chemical Company; or mixtures thereof. In some embodiments, the polymer binder comprises polyurethane. Suitable commercially available polyurethane dispersions include, for example, BAYHYDROL™ XP-2557, BAYHYDROL XP-2606, BAYHYDROL XP-2427, and BAYHYDROL XP-2651 polyurethane dispersions all available from Bayer; or mixtures thereof. A mixture of an acrylic copolymer described above with polyurethane may be used.

The polymer binder in the coating composition of the present invention may be, based on the total weight of the coating composition, in an amount of 1 wt % or more, 12 wt % or more, or even 25 wt % or more, and at the same time, 40 wt % or less, 35 wt % or less, or even 33 wt % or less. When a polymer binder emulsion or dispersion is used, weight percentage of the polymer binder refers to the dry weight of the polymer binder emulsion or dispersion based on the total weight of the coating composition.

The aqueous coating composition of the present invention further comprises two different matting agents. The two matting agents the first and second matting agents have different specific surface areas. "Matting agents" herein refer to any inorganic or organic particles that provide matt effect. Matting agents usually have an average particle size of 5.5 microns or more according to the ASTM E2651-10 method.

The aqueous coating composition of the present invention comprises one or more first matting agents having a specific surface area larger than 100 square meters per gram ($m^2/g$) according to the ASTM D1993-03(2008) method. The first matting agent may have a specific area of 150 $m^2/g$ or higher, or even 200 $m^2/g$ or higher, and at the same time, 350 $m^2/g$ or lower, or even 300 $m^2/g$ or lower.

The first matting agent useful in the present invention may be a silica matting agent, a polyurea matting agent, or mixtures thereof. Suitable commercially available first matting agents include, for example, ACEMATT™ TS-100 and ACEMATT OK520 silica matting agents both available from Evonik, DEUTERON™ MK polyurea matting agent available from Deuteron, SYLOID™ Silica 7000 matting agent available from Grace Davison, or mixtures thereof.

The concentration of the first matting agent may be, based on the total weight of the coating composition, 0.5 wt % or more, 0.6 wt % or more, or even 0.8 wt % or more, and at the same time, 2 wt % or less, 1.5 wt % or less, or even 1.2 wt % or less.

The aqueous coating composition of the present invention also comprises one or more second matting agents having a specific surface area smaller than 5 $m^2/g$ according to the ASTM D1993-03(2008) method. The second matting agent may have a specific surface area of 4 $m^2/g$ or lower, or even 3 $m^2/g$ or lower, and at the same time, 0.1 $m^2/g$ or higher, or even 0.5 $m^2/g$ or higher.

The second matting agent useful in the present invention may be based on polyacrylate, polyethylene, polytetrafluoroethene, or mixtures thereof. The second matting agent may be in the form of an emulsion. Suitable commercially available second matting agent emulsions include, for example, PARALOID™ PRD 137B emulsion based on polyacrylate available from The Dow Chemical Company; ULTRALUBE™ D277 emulsion based on HDPE/plastic, ULTRALUBE D818 emulsion based on montan/PE/plastic, and ULTRALUBE D860 emulsion based on PE/ester matting agents all available from Keim-Additec; or mixtures thereof.

The concentration of the second matting agent may be, based on the total weight of the coating composition, 1 wt % or more, 1.5 wt % or more, or even 2 wt % or more, and at the same time, 6 wt % or less, 5.5 wt % or less, or even 5 wt % or less. When a second matting agent emulsion is used, weight percentage of the second matting agent refers to the dry weight of the second matting agent emulsion based on the total weight of the coating composition.

The aqueous coating composition of the present invention further comprises one or more epoxy silanes. The epoxy silanes may be epoxy silane oligomers, epoxyalkylalkoxysilanes, or mixtures thereof. Examples of suitable epoxyalkylalkoxysilanes include 3-glycidoxypropyltrimethoxysilane; 3-glycidoxypropylmethyldiethoxysilane; 3-glycidoxypropyltriethoxysilane; beta-(3,4-epoxycyclohexyl)ethyltriethoxysilane; or mixtures thereof. Suitable commercially available epoxy silanes include, for example, SILQUEST™ A-187, SILQUEST WetLink 78, SILQUEST A-1871, and SILQUEST A-186 epoxy silanes all available from Momentive; or mixtures thereof.

The concentration of the epoxy silane may be, based on the total weight of the coating composition, 0.1 wt % or more, 0.15 wt % or more, or even 0.2 wt % or more, and at the same time, 1 wt % or less, 0.8 wt % or less, 0.6 wt % or less, 0.5 wt % or less, or even 0.4 wt % or less.

The aqueous coating composition of the present invention further comprises one or more waxes. The wax may comprise polyethylene (PE) wax, polypropylene (PP) wax, carnauba wax, paraffin wax, polyethylene acrylic acid wax, or mixtures thereof. Paraffin wax typically has a melting temperature of 46 to 71° C. In some embodiments, high density polyethylene (HDPE) wax is used.

The wax useful in the present invention generally has an average particle size of no more than 4.5 microns according to ASTM E2651-10 method. The wax may have an average particle size of 2 microns or lower, 1.4 microns or lower, or even 1 micron or lower, and at the same time, 0.05 microns or higher, 0.1 microns or higher, or even 0.15 microns or higher.

The wax useful in the present invention is generally in the form of an emulsion or a dispersion. The wax emulsion or dispersion may have, based on the total weight of the wax emulsion, a solids content of from 20 to 70 wt %, from 30 to 60 wt %, or from 40 to 50 wt %.

Suitable commercially available wax emulsions or dispersions include, for example, MICHEM™ ME 62330 paraffin/PE wax emulsion, MICHEM ME 34935 paraffin/ethylene acrylic acid wax emulsion, MICHEM 180 paraffin/carnauba wax emulsion, and MICHEM ME 71450 paraffin wax emulsion all available from Michelman Inc.; ULTRALUBE E340 paraffin wax emulsion and ULTRALUBE E668H PP wax emulsion both available from Keim-Additec; or mixtures thereof.

The concentration of the wax may be, based on the total weight of the coating composition, 0.5 wt % or more, 0.8 wt % or more, or even 1 wt % or more, and at the same time, 6 wt % or less, 5 wt % or less, 4 wt % or less, or even 3 wt % or less. When a wax emulsion or dispersion is used, weight percentage of the wax refers to the dry weight of the wax emulsion based on the total weight of the coating composition.

The aqueous coating composition of the present invention may further comprise a crosslinking agent. Examples of suitable crosslinking agents include adipic dihydrazide, sebacic dihydrazide, polyhydrazide, propylenediamine, cyclohexyldiamine, or mixtures thereof. When present, the concentration of the crosslinking agent may be, based on the total weight of the coating composition, 0.05 wt % or more, 0.2 wt % or more, or even 0.5 wt % or more, and at the same time, 5 wt % or less, 2 wt % or less, or even 1 wt % or less.

The aqueous coating composition of the present invention may further comprise one or more wetting agents. "Wetting agent" herein refers to a chemical additive that reduces the surface tension of a coating composition, causing the coating composition to more easily spread across or penetrate the surface of a substrate. Wetting agents may be polycarboxylates, anionic, zwitterionic, or non-ionic. Suitable commercially available wetting agents include, for example, SURFYNOL™ 104 nonionic wetting agent based on an actacetylenic diol available from Air Products, BYK™-346 and BYK-349 polyether-modified siloxanes both available from BYK, or mixtures thereof.

When present, the concentration of the wetting agent may be, based on the total weight of the coating composition, 0.1 wt % or more, 0.5 wt % or more, or even 1 wt % or more, and at the same time, 2.5 wt % or less, 2 wt % or less, or even 1 wt % or less.

The aqueous coating composition of the present invention may further comprise one or more defoamers, also known as "defoaming agents" or "antifoaming agents". "Defoamer" herein refers to a chemical additive that reduces and hinders the formation of foam. Defoamers may be silicone-based defoamers, mineral oil-based defoamers, ethylene oxide/propylene oxide-based defoamers, alkyl polyacrylates, or mixtures thereof. Suitable commercially available defoamers include, for example, TEGO™ 902 W and TEGO Foamex 1488 polyether siloxane copolymer emulsions both available from TEGO, BYK-024 silicone deformer available from BYK, or mixtures thereof. When present, the concentration of the defoamer may be, based on the total weight of the coating composition, generally from 0.01 to 1 wt %, from 0.05 to 0.8 wt %, or from 0.1 to 0.5 wt %.

The aqueous coating composition of the present invention may further comprise one or more thickeners, also known as "rheology modifiers". The thickeners may be polyvinyl alcohol (PVA), clay materials, acid derivatives, acid copolymers, urethane associate thickeners (UAT), polyether urea polyurethanes (PEUPU), polyether polyurethanes (PEPU), or mixtures thereof. Examples of suitable thickeners include alkali swellable emulsions (ASE) such as sodium or ammonium neutralized acrylic acid polymers; hydrophobically modified alkali swellable emulsions (HASE) such as hydrophobically modified acrylic acid copolymers; associative thickeners such as hydrophobically modified ethoxylated urethanes (HEUR); and cellulosic thickeners such as methyl cellulose ethers, hydroxymethyl cellulose (HMC), hydroxyethyl cellulose (HEC), hydrophobically-modified hydroxy ethyl cellulose (HMHEC), sodium carboxymethyl cellulose (SCMC), sodium carboxymethyl 2-hydroxyethyl cellulose, 2-hydroxypropyl methyl cellulose, 2-hydroxyethyl methyl cellulose, 2-hydroxybutyl methyl cellulose, 2-hydroxyethyl ethyl cellulose, and 2-hydoxypropyl cellulose. Preferably, the thickener is based on HEUR, for example, ACRYSOL™ RM-8W rheology modifier available from The Dow Chemical Company. When present, the concentration of the thickener is, based on the total weight of the coating composition, generally from 0.05 to 3 wt %, from 0.1 to 2 wt %, or from 0.3 to 1 wt %.

The aqueous coating composition of the present invention may further comprise solvents. Examples of suitable solvents include 2-n-butoxyethanol, dipropylene glycol n-butyl ether, propylene glycol n-butyl ether, dipropylene glycol methyl ether, propylene glycol methyl ether, propylene glycol n-propyl ether, or mixtures thereof. When present, the concentration of the solvent may be, based on the total weight of the coating composition, 0.1 wt % or more, 1 wt % or more, or even 3 wt % or more, and at the same time, 10 wt % or less, 8 wt % or less, or even 5 wt % or less.

The aqueous coating composition of the present invention may further comprise water. The concentration of water may be, based on the total weight of the coating composition, from 30 to 90 wt %, from 40 to 80 wt %, or from 60 to 70 wt %.

In addition to the components described above, the aqueous coating composition of the present invention may further comprise any one or combination of the following additives: inorganic extenders, pigments, coalescing agents, cosolvents, buffers, neutralizers, non-thickening rheology modifiers, dispersants, humectants, mildewcides, biocides, anti-skinning agents, colorants, flowing agents, crosslinkers, anti-oxidants, plasticizers, leveling agents, dispersants, thixotropic agents, adhesion promoters, diluents and grind vehicles. When present, these additives may be in an amount of from 0.001 to 10 wt %, or from 0.01 to 2 wt %, based on the total weight of the aqueous coating composition.

The aqueous coating composition of the present invention may be prepared with techniques known in the coating art. The aqueous coating composition can be prepared by admixing the polymer binder, the first matting agent, the second matting agent, the epoxy silane and the wax described above. The polymer binder, the second matting agent and the wax are preferably dispersed in water. Other optional components may also be added as described above. Components in the aqueous coating composition may be mixed in any order to provide the aqueous coating composition of the present invention. Any of the above-mentioned optional components may also be added to the composition during or prior to the mixing to form the aqueous coating composition.

The aqueous coating composition of the present invention has good stability. In some embodiments, the aqueous coating composition after 14-day heat aging at 50° C., provides the resultant coating film with substantially the same 60° gloss, clarity, water resistance, and 48% alcohol resistance properties as before aging.

The process of using the aqueous coating composition of the present invention may comprise the following: applying the coating composition to a substrate, and drying the applied coating composition. The obtained coating film after drying the coating composition applied to the substrate has a gloss level of no more than 20 on a 60° Gardner Gloss scale, a clarity value of at least 30%, and a water-resistance level of at least 4 and a 48% alcohol-resistance level of at least 4 according to the BS: EN12720:2009 method.

The aqueous coating composition of the present invention can be applied to a substrate by incumbent means including brushing, dipping, rolling and spraying. The aqueous coating composition is preferably applied by spraying. The standard spray techniques and equipment for spraying such as air-atomized spray, air spray, airless spray, high volume low pressure spray, and electrostatic spray such as electrostatic bell application, and either manual or automatic methods can be used. Drying the applied coating composition is generally conducted at room temperature (22 to 25° C.), or even at 35 to 60° C.

The aqueous coating composition of the present invention can be applied to, and adhered to, various substrates. Examples of suitable substrates include wood, metals, plastics, foams, stones, elastomeric substrates, glass, fabrics, concrete, or cementious substrates. The aqueous coating composition is suitable for various coating applications, such as marine and protective coatings, automotive coatings, wood coatings, coil coatings, plastic coatings, powder coatings, can coatings, and civil engineering coatings. The aqueous coating composition is particularly suitable for wood coatings. The aqueous coating composition can be used alone, or in combination with other coatings to form multi-layer coatings. For example, a multi-layer coating may comprise the aqueous coating composition of the present invention as a primer, a tie coat and, optionally, a topcoat.

EXAMPLES

Some embodiments of the invention will now be described in the following Examples, wherein all parts and percentages are by weight unless otherwise specified. The following materials are used in the examples:

DEUTERON MK matting agent, available from Deuteron, is based on polyurea powder having a specific surface area of 200-300 m$^2$/g and an average particle size of 6.3 microns.

ACEMATT TS-100 matting agent, available from Evonik, is fumed silica powder having a specific surface area of 220-280 m$^2$/g and an average particle size of 9.5 microns.

PARALOID PRD 137B emulsion (solids content: 40 wt %), available from The Dow Chemical Company, is based on polyacrylate used as a matting agent having a specific surface area of 0.1-1.5 m$^2$/g and an average particle size of 5.5 microns.

ULTRALUBE D860 emulsion (solids content: 60 wt %), available from Keim-Additec, is based on PE/ester wax used as a matting agent having a specific surface area of 0.1-1.5 m$^2$/g and an average particle size of 8 microns.

SILQUEST A-187 silane is a liquid 3-glycidoxypropyltrimethoxysilane available from Momentive.

COATOSIL™ MP 200 silane is a liquid epoxy functional silane oligomer available from Momentive.

COATOSIL 2287 silane is a liquid 3-glycidoxypropylmethyldiethoxysilane available from Momentive.

ULTRALUBE E340 wax emulsion (solids content: 50 wt %), available from Keim-Additec, is based on paraffin wax having an average particle size of smaller than 1 micron.

MICHEM 62330 wax emulsion (solids content: 30 wt %), available from Michem, is based on paraffin/PE wax having an average particle size of smaller than 1 micron.

ULTRALUBE D806 aqueous micro-dispersion (solids content: 60 wt %), available from Keim-Additec, is based on HDPE wax having an average particle size of 4.3 microns.

ULTRALUBE MD2000 aqueous micro dispersion (solids content: 50 wt %), available from Keim-Additec, is based on HDPE wax having an average particle size of 1.2 microns.

BAYDERM™ FINISH 91 UD polyurethane dispersion ("PUD") contains 40 wt % solids, available from The Dow Chemical Company.

Butyl CELLOSOLVE™ glycol ether ("BCS") is ethylene glycol monobutyl ether used as a coalescent available from The Dow Chemical Company.

DOWANOL™ DPnB glycol ether ("DPnB") is dipropylene glycol n-butyl ether used as a coalescent available from The Dow Chemical Company.

TEGO™ Airex 902 W defoamer is available from Tego.

BYK-346 wetting agent is available from BYK.

ACRYSOL RM-8W rheology modifier ("RM-8W") is available from The Dow Chemical Company.

LATEMUL PD-104 surfactant is an anionic polymerizable surfactant available from Kao Chemicals.

2-ethylhexyl acrylate ("2-EHA") is available from The Dow Chemical Company.

Methyl methacrylate ("MMA") is available from The Dow Chemical Company.

Methacrylic acid ("MAA") is available from The Dow Chemical Company.

Diacetone acrylamide ("DAAM") is available from Kyowa Hakko Chemical Co., Ltd.

Adipic dihydrazide ("ADH") is available from Kyowa Hakko Chemical Co., Ltd.

Butyl acrylate ("BA") is available from The Dow Chemical Company.

The following standard analytical equipment and methods are used in the Examples.

Specific Surface Area

The specific surface area of matting agents is measured according to ASTM D1993-03(2008) method.

Average Particle Size

The average particle size is measured by ASTM E2651-10 method.

60° Gloss

A coating composition is coated on LENETA™ black vinyl chart to form a 120 microns thick wet film using a drawdown applicator, then is cured in an oven at 50° C. for 48 hours. The gloss of the obtained coating film is measured on a 60° Gardner Gloss scale.

Clarity

A coating composition is coated on a glass plate to form a 120 microns thick wet film using a drawdown applicator, then is cured in an oven at 50° C. for 48 hours to form a panel. A BYK haze-gard dual haze meter is used to evaluate the clarity of the obtained coating film. Clarity is calculated using the following equation:

Clarity=Transmittance*(1−Haze)

The clarity of the glass plate before applying the coating composition is denoted as $C_{glass}$. The clarity of the panel is denoted as $C_{glass+film}$. The clarity of the coating film is measured according to the following equation:

Clarity of the coating film=[$C_{glass+film}$(1−$C_{glass}$)]×100%

A clarity value of at least 30% for the coating film is acceptable for wood coatings. The higher the clarity value, the better clarity.

Water Resistance and 48% Alcohol Resistance

The water resistance and 48% alcohol resistance properties of coating films are determined by the BS EN 12720: 2009 method.

Panels are prepared by brush applying three layers of coats at 80-90 grams per square meter (gram/m$^2$) over wood. After the first coat, panels are left at room temperature for 4 hours, then are sanded with sand paper. After the third coat, panels are dried at room temperature for 4 hours, then are placed in an oven at 50° C. for 48 hours before the water resistance or alcohol resistance test.

For the water resistance test, disc type filter paper is saturated with water, then is placed on the above finished panels and covered with a cap to reduce evaporation. After 24 hours, the cap is removed. Tested areas are wiped with wet facial tissues, and dried at room temperature to observe the degree of damage. The degree of damage is defined as the following levels. The higher the rating level, the better the water resistance.

For the 48% alcohol resistance test, filter discs are saturated with 48% alcohol, then are placed on the above finished panels and covered with a cap to reduce evaporation. After 1 hour, the cap is removed. Tested areas are wiped with wet facial tissues, and dried at room temperature to observe the damage degree. The degree of damage is defined as the following levels. The higher the rating level, the better the 48% alcohol resistance.

5—No change: Test area indistinguishable from adjacent surrounding area.

4—Minor change: Test area distinguishable from adjacent surrounding area, only when the light source is mirrored on the test surface and is reflected towards the observer's eye, for example, discoloration; change in gloss and color; and/or no change in the surface structure such as swelling, fiber raising, cracking and/or blistering.

3—Moderate change: Test area distinguishable from adjacent surrounding area, visible in several viewing directions, for example, discoloration; change in gloss and color; and/or no change in the surface structure such as swelling, fiber raising, cracking and/or blistering.

2—Significant change: Test area clearly distinguishable from adjacent surrounding area, visible in all viewing directions, for example, discoloration; change in gloss and color; and/or slightly change in the surface structure such as swelling, fiber raising, cracking and/or blistering.

1—Strong change: The structure of the surface being distinctly changed and/or discoloration, change in gloss and color, and/or the surface material being totally or partially removed, and/or the filter paper adhering to the surface.

Preparation of an Acrylic Copolymer Emulsion

Preparation of Monomer Emulsion 1: LATEMUL PD-104 surfactant (18 grams (g), 20 wt % solids) was dissolved in deionized water (130 g) with stirring. Then 2-EHA (136 g), MMA (306 g), and MAA (9 g) were slowly added into the resulting surfactant solution to obtain Monomer Emulsion 1.

Preparation of Monomer Emulsion 2: LATEMUL PD-104 surfactant (36 g, 20 wt % solids) was dissolved in deionized water (128 g) with stirring. Then 2-EHA (204 g), MMA (207 g), DAAM (22.6 g), and MAA (18.3 g) were added into the resultant surfactant solution to obtain Monomer Emulsion 2.

A solution containing LATEMUL PD-104 surfactant (22 g, 20 wt % solids) and deionized water (548 g) was added into a 4-neck, 5 liter round bottom flask equipped with a thermocouple, a cooling condenser and an agitator, and was heated to 85° C. under nitrogen atmosphere. An aqueous sodium carbonate solution (1.4 g sodium carbonate in 38 g deionized water), an aqueous ammonia persulfate (APS) initiator solution (1.4 g APS in 15 g deionized water), and 4.1 wt % of Monomer Emulsion 1 obtained above were then added into the flask. Within about 5 minutes, initiation of polymerization was confirmed by a temperature increase by 3° C. and a change of the external appearance of the reaction mixture. After heat generation stopped, the remaining Monomer Emulsion 1 was added gradually to the flask over a period of 90 minutes with stirring, and the temperature was maintained at 79-81° C. Monomer Emulsion 2 obtained above was then added into the flask in the same manner as Monomer Emulsion 1 over 90 minutes. Upon completing addition, the reaction mixture was held at 70° C. for 60 minutes, then cooled down to 50° C. and neutralized to a pH value of 7.0-8.0 by a 30% aqueous ammonia solution. The obtained mixture was held at 45-50° C. for 10 minutes. Then ADH slurry (18 g in 33 g water) was added into the flask over 10 minutes. The resultant mixture was cooled down to room temperature to obtain the acrylic copolymer emulsion. The obtained acrylic copolymer emulsion had the following properties: pH value: 7.5, solids content: 42.5 wt %, Brookfield viscosity: 188 centipoises (cps), average particle size: 99 nanometers, and average $T_g$: 4° C.

Examples (Exs) 1-12

Coating compositions of Exs 1-12 were prepared based on formulations shown in Table 1. The ingredients listed in Table 1 (let down) were mixed using a conventional lab mixer.

Comparative Examples (Comp Exs) A-P

Coating compositions of Comp Exs A-P were prepared based on formulations shown in Table 2. The coating composition of Comp Ex H was substantially similar as disclosed in EP2428530A1. The ingredients listed in Table 2 (let down) were mixed using a conventional lab mixer.

Properties of coating films made from these compositions are given in Table 3. Weight percentage below is based on the total weight of the coating composition.

Coating films made from the coating compositions of Comp Exs A-H, Comp Ex I (0.05 wt % epoxy silane), Comp Ex K (2.5 wt % first matting agent) and Comp Ex M (8 wt % second matting agent) all could not pass the IKEA IOS-MAT-0066 R2 standard for water resistance and 48% alcohol resistance. In addition, the 60° gloss of coating films made from Comp Exs B and H was too high to be acceptable, and the clarity of Comp Exs A, C, E and K was too low to be acceptable.

The 60° gloss of coating films made from the coating compositions of Comp Ex J (0.2 wt % first matting agent) and Comp Ex L (0.66 wt % second matting agent) was too high to be acceptable.

Coating films made from the coating compositions of Comp Ex N (0.2 wt % wax) and Comp Ex P (8 wt % wax) could not pass the IKEA IOS-MAT-0066 R2 standard for 48% alcohol resistance. In addition, the 60° gloss of the coating film made from Comp Ex P was too high to be acceptable.

In contrast, coating films made from the coating compositions of Exs 1-12 all showed a 60° gloss level of no more than 20, a clarity value of at least 30%, and a water-resistance level and a 48% alcohol-resistance level of 4 or higher. In addition, the matting efficiency of coating compositions of Exs 1-12 was increased by the certain combination of the first and second matting agents, epoxy silane, and wax.

After 14-day heat aging at 50° C., the coating compositions of Exs 1-12 still provided the resultant coating films with the same 60° gloss, clarity, water-resistance and 48% alcohol-resistance properties as before aging.

TABLE 1

| Gram (g) | Ex 1 | Ex 2 | Ex 3 | Ex 4 | Ex 5 | Ex 6 | Ex 7 | Ex 8 | Ex 9 | Ex 10 | Ex 11 | Ex 12 |
|---|---|---|---|---|---|---|---|---|---|---|---|---|
| Acrylic Copolymer Emulsion | 65.34 g | 72.6 g | 72.6 g | 72.6 g | 72.6 g | 72.6 g | 72.6 g | 72.6 g | 72.6 g | 72.6 g | 72.6 g | 65.34 g |
| PUD | 7.26 g | — | — | — | — | — | — | — | — | — | — | 7.26 g |
| BCS | 3.99 g | 3.99 g | 3.99 g | 3.99 g | 3.99 g | 3.99 g | 3.99 g | 3.99 g | 3.99 g | 3.99 g | 3.99 g | 3.99 g |
| DPnB | 1.13 g | 1.13 g | 1.13 g | 1.13 g | 1.13 g | 1.13 g | 1.13 g | 1.13 g | 1.13 g | 1.13 g | 1.13 g | 1.13 g |
| Defoamer | 0.37 g | 0.37 g | 0.37 g | 0.37 g | 0.37 g | 0.37 g | 0.37 g | 0.37 g | 0.37 g | 0.37 g | 0.37 g | 0.37 g |
| BYK346 | 0.3 g | 0.3 g | 0.3 g | 0.3 g | 0.3 g | 0.3 g | 0.3 g | 0.3 g | 0.3 g | 0.3 g | 0.3 g | 0.3 g |
| 1st Matting Agent (Type/Weight) | MK 1 g | MK 1 g | MK 1 g | MK 1 g | MK 1 g | MK 1 g | MK 1 g | MK 1 g | MK 1 g | MK 1 g | TS-100 0.8 g | TS-100 0.8 g |
| wt % of 1st Matting Agent | 1 | 1 | 1 | 1 | 1 | 1 | 1 | 1 | 1 | 1 | 0.8 | 0.8 |
| Water | 5.34 g | 5.34 g | 5.24 g | 5.34 g | 7.01 g | 8.34 g | 9.18 g | 7.34 g | 7.54 g | 7.14 g | 5.44 g | 7.21 g |
| RM-8W | 0.3 g | 0.3 g | 0.3 g | 0.3 g | 0.3 g | 0.3 g | 0.3 g | 0.3 g | 0.3 g | 0.3 g | 0.3 g | 0.3 g |
| 2nd Matting Agent Emulsion (Type/Weight) | D860 6.67 g | D860 6.67 g | D860 6.67 g | D860 6.67 g | 137B 5 g | D860 6.67 g | D860 6.67 g | D860 6.67 g | D860 6.67 g | D860 6.67 g | D860 6.67 g | 137B 5 g |
| wt % of 2nd Matting Agent | 4 | 4 | 4 | 4 | 2 | 4 | 4 | 4 | 4 | 4 | 4 | 2 |
| Epoxy Silane (Type/Weight) | A187 0.3 g | A187 0.3 g | MP200 0.4 g | 2287 0.3 g | A187 0.3 g | A187 0.3 g | A187 0.3 g | A187 0.3 g | A187 0.1 g | A187 0.5 g | MP200 0.4 g | A187 0.3 g |
| wt % of Epoxy Silane | 0.3 | 0.3 | 0.4 | 0.3 | 0.3 | 0.3 | 0.3 | 0.3 | 0.1 | 0.5 | 0.4 | 0.3 |
| Wax Emulsion (Type/Weight) | E340 8 g | E340 8 g | E340 8 g | E340 8 g | E340 8 g | 62330 5 g | D806 4.16 g | MD2000 6 g | MD2000 6 g | MD2000 6 g | E340 8 g | E340 8 g |
| wt % of Wax | 4 | 4 | 4 | 4 | 4 | 1.5 | 2.5 | 3 | 3 | 3 | 4 | 4 |

*wt % is based on the total weight of the coating composition

TABLE 2

| Gram (g) | Comp Ex A | Comp Ex B | Comp Ex C | Comp Ex D | Comp Ex E | Comp Ex F | Comp Ex G | Comp Ex H |
|---|---|---|---|---|---|---|---|---|
| Acrylic Copolymer Emulsion | 72.6 g | 72.6 g | 72.6 g | 72.6 g | 72.6 g | 72.6 g | 72.6 g | 72.21 g |
| BCS | 3.99 g | 3.99 g | 3.99 g | 3.99 g | 3.99 g | 3.99 g | 3.99 g | 3.99 g |
| DPnB | 1.13 g | 1.13 g | 1.13 g | 1.13 g | 1.13 g | 1.13 g | 1.13 g | 1.13 g |
| Defoamer | 0.37 g | 0.37 g | 0.37 g | 0.37 g | 0.37 g | 0.37 g | 0.37 g | 0.37 g |
| BYK346 | 0.3 g | 0.3 g | 0.3 g | 0.3 g | 0.3 g | 0.3 g | 0.3 g | 0.3 g |
| MK Matting Agent | 3 g | — | 3 g | 3 g | 3 g | 1 g | 1 g | — |
| wt % of MK Matting Agent | 3 | — | 3 | 3 | 3 | 1 | 1 | — |
| Water | 18.31 g | 14.64 g | 18.01 g | 10.31 g | 10.01 g | 7.31 g | 15.01 g | — |
| RM-8w | 0.3 g | 0.3 g | 0.3 g | 0.3 g | 0.3 g | 0.3 g | 0.3 g | 0.3 g |
| 2nd Matting Agent Emulsion (type/weight) | — | D860 6.67 g | — | — | — | 137B 5 g | 137B 5 g | 137B 12.5 g |
| wt % of 2nd Matting Agent | — | 4 | — | — | — | 2 | 2 | 5 |
| Epoxy Silane (Type/Weight) | — | — | A187 0.3 g | — | A187 0.3 g | — | A187 0.3 g | MP200 1.2 g |
| wt % of Epoxy Silane | — | — | 0.3 | — | 0.3 | — | 0.3 | 1.2 |
| E340 Wax Emulsion | — | — | — | 8 g | 8 g | 8 g | — | 8 g |
| wt % of Wax | — | — | — | 4 | 4 | 4 | — | 4 |

| Gram (g) | Comp Ex I | Comp Ex J | Comp Ex K | Comp Ex L | Comp Ex M | Comp Ex N | Comp Ex P |
|---|---|---|---|---|---|---|---|
| Acrylic Copolymer Emulsion | 72.6 g | 72.6 g | 72.6 g | 72.6 g | 71.31 g | 72.6 g | 69.94 g |
| BCS | 3.99 g | 3.99 g | 3.99 g | 3.99 g | 3.99 g | 3.99 g | 3.99 g |
| DPnB | 1.13 g | 1.13 g | 1.13 g | 1.13 g | 1.13 g | 1.13 g | 1.13 g |
| Defoamer | 0.37 g | 0.37 g | 0.37 g | 0.37 g | 0.37 g | 0.37 g | 0.37 g |
| BYK346 | 0.3 g | 0.3 g | 0.3 g | 0.3 g | 0.3 g | 0.3 g | 0.3 g |
| MK Matting Agent | 1 g | 0.2 g | 2.5 g | 1 g | 1 g | 1 g | 1 g |
| wt % of MK Matting Agent | 1 | 0.2 | 2.5 | 1 | 1 | 1 | 1 |
| Water | 5.59 g | 6.14 g | 3.84 g | 10.91 g | — | 12.94 g | — |
| RM-8w | 0.3 g | 0.3 g | 0.3 g | 0.3 g | 0.3 g | 0.3 g | 0.3 g |
| 2nd Matting Agent Emulsion (type/weight) | D860 6.67 g | D860 6.67 g | D860 6.67 g | D860 1.1 g | D860 13.3 g | D860 6.67 g | D860 6.67 g |
| wt % of 2nd Matting Agent | 4 | 4 | 4 | 0.66 | 8 | 4 | 4 |
| Epoxy Silane (Type/Weight) | A187 0.05 g | A187 0.3 g | A187 0.3 g | A187 0.3 g | A187 0.3 g | A187 0.3 g | A187 0.3 g |
| wt % of Epoxy Silane | 0.05 | 0.3 | 0.3 | 0.3 | 0.3 | 0.3 | 0.3 |

TABLE 2-continued

| | | | | | | | |
|---|---|---|---|---|---|---|---|
| E340 Wax Emulsion | 8 g | 8 g | 8 g | 8 g | 8 g | 0.4 g | 16 g |
| wt % of Wax | 4 | 4 | 4 | 4 | 4 | 0.2 | 8 |

*wt % is based on the total weight of the coating composition

TABLE 3

Properties of Coating Film

| | 60° gloss | Clarity, % | Water Resistance | 48% Alcohol Resistance |
|---|---|---|---|---|
| Ex 1 | 15 | 48 | 5 | 5 |
| Ex 2 | 17 | 45 | 4 | 4 |
| Ex 3 | 18 | 44 | 4 | 4 |
| Ex 4 | 17 | 46 | 4 | 4 |
| Ex 5 | 17 | 39 | 4 | 4 |
| Ex 6 | 19 | 47 | 4 | 4 |
| Ex 7 | 15 | 40 | 4 | 4 |
| Ex 8 | 15 | 42 | 4 | 4 |
| Ex 9 | 16 | 43 | 4 | 4 |
| Ex 10 | 15 | 40 | 4 | 4 |
| Ex 11 | 19 | 43 | 4 | 4 |
| Ex 12 | 20 | 39 | 4 | 4 |
| Comp Ex A | 18 | 29 | 1 | 2 |
| Comp Ex B | 45 | 76 | 3 | 3 |
| Comp Ex C | 14 | 25 | 3 | 3 |
| Comp Ex D | 18 | 31 | 2 | 2 |
| Comp Ex E | 16 | 28 | 3 | 3 |
| Comp Ex F | 17 | 35 | 3 | 3 |
| Comp Ex G | 17 | 33 | 3 | 3 |
| Comp Ex H | 40 | 78 | 2 | 2 |
| Comp Ex I | 16 | 43 | 3 | 3 |
| Comp Ex J | 46 | 79 | 4 | 4 |
| Comp Ex K | 8 | 19 | 3 | 3 |
| Comp Ex L | 34 | 75 | 4 | 4 |
| Comp Ex M | 11 | 38 | 3 | 3 |
| Comp Ex N | 16 | 44 | 4 | 3 |
| Comp Ex P | 25 | 49 | 4 | 3 |

What is claimed is:

1. An aqueous coating composition comprising, based on the total weight of the coating composition,
   (a) 1-40 wt % of a polymer binder,
   (b) 0.5-2 wt % of a first matting agent having a specific surface area larger than 100 square meters per gram according to ASTM D1993-03(2008) method,
   (c) 1-6 wt % of a second matting agent having a specific surface area smaller than 5 square meters per gram according to ASTM D1993-03(2008) method,
   (d) 0.1-1 wt % of an epoxy silane, and
   (e) 0.5-6 wt % of a wax.

2. The aqueous coating composition of claim 1, wherein the wax comprises paraffin wax, polyethylene wax, or a mixture thereof.

3. The aqueous coating composition of claim 1, wherein the wax has an average particle size of no more than 4.5 microns according to ASTM E2651-10 method.

4. The aqueous coating composition of claim 1, wherein the coating composition comprises 0.8-1.5 wt % of the first matting agent, 1.5-5.5 wt % of the second matting agent, 0.1-0.6 wt % of the epoxy slime, and 0.8-5 wt % of the wax.

5. The aqueous coating composition of claim 1, wherein the first matting agent has a specific surface area of 150-350 square meters per gram.

6. The aqueous coating composition of claim 1, wherein the first matting agent is selected from a silica matting agent, a polyurea matting agent, or mixtures thereof.

7. The aqueous coating composition of claim 1, wherein the second matting agent has a specific surface area of 0.1-4 square meters per gram.

8. The aqueous coating composition of claim 1, wherein the second matting agent is selected from a polyacrylate matting agent; a polyethylene matting agent, a polytetrafluoroethene matting agent, or a mixture thereof.

9. The aqueous coating composition of claim 1, wherein the epoxy silane is selected from an epoxy silane oligomer; 3-glycidoxypropyltrimethoxysilane; 3-glycidoxypropylmethyldiethoxysilane; 3-glycidoxypropyltriethoxysilane; beta-(3,4-epoxycyclohexyl)ethyltriethoxysilane; or mixtures thereof.

10. The aqueous coating composition of claim 1, wherein the wax has an average particle size of 2 microns or less.

11. The aqueous coating composition of claim 1, wherein the polymer binder is selected from an acrylic copolymer, polyurethane, or mixtures thereof.

12. The aqueous coating composition of claim 11, wherein the acrylic copolymer comprises a copolymerized ethylenically unsaturated monomer having a functional group selected from carbonyl, acetoacetate, alkoxysilane, carboxyl, ureido, amide, imide, amino group, or mixtures thereof.

13. The aqueous coating composition of claim 1, further comprising at least one of water, solvents, a wetting agent, a defoamer, a thickener.

14. An aqueous coating composition comprising, based on the total weight of the coating composition,
   (a) 12-35 wt % of an acrylic copolymer comprising a copolymerized ethylenically unsaturated monomer having a functional group selected from carbonyl, acetoacetate, alkoxysilane, carboxyl, ureido, amide, imide, amino group, or mixtures thereof;
   (b) 0.8-1.2 wt. % of a first matting agent selected from silica, polyurea, or mixtures thereof,
   (c) 2-5 wt % of a second matting agent selected from a polyacrylate matting agent, a polyethylene matting agent, a polytetrafluoroethene matting agent, or mixtures thereof;
   (d) 0.2-0.4 wt % of an epoxy silane selected from an epoxy silane oligomer, 3-glycidoxypropyltrimethoxysilane, 3-glycidoxypropylmethyldiethoxysilane, 3-glycidoxypropyltriethoxysilane, beta-(3,4-epoxycyclohexyl)ethyltriethoxysilane, or a mixture thereof;
   (e) 1-3 wt % of a wax comprising paraffin wax, polyethylene wax, or mixtures thereof; wherein the wax has an average particle size of no more than 1.4 microns according to ASTM E2651-10 method;
   (f) 40-70 wt % water;
   (g) 0-8 wt % solvent; and
   (h) 0-1 wt % a crosslinking agent.

15. A process of using the aqueous coating composition of claim 1 comprising:
   applying the coating composition to a substrate, and
   drying the applied coating composition;
   wherein the coating after drying the coating composition applied to the substrate has a gloss level of no more than 20 on a 60° Gardner Gloss scale; a clarity value of at least 30%, and a water-resistance level of at least 4 and a 48% alcohol-resistance level of at least 4 according to BS: EN12720:2009 method.

* * * * *